P. ODA.
BAND CUTTER AND FEEDER FOR THRESHING MACHINES.
APPLICATION FILED JULY 10, 1920.
1,399,271.  Patented Dec. 6, 1921.
2 SHEETS—SHEET 2.
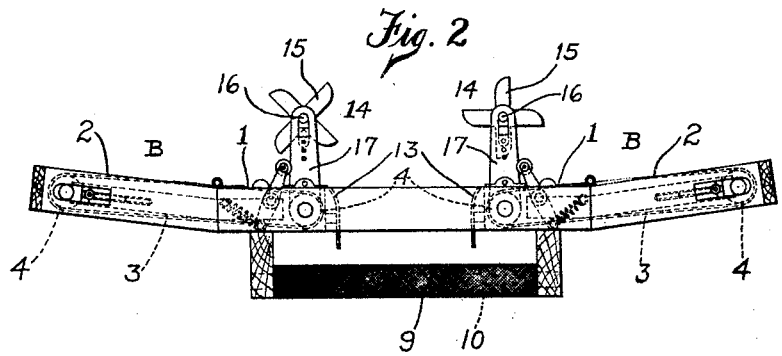
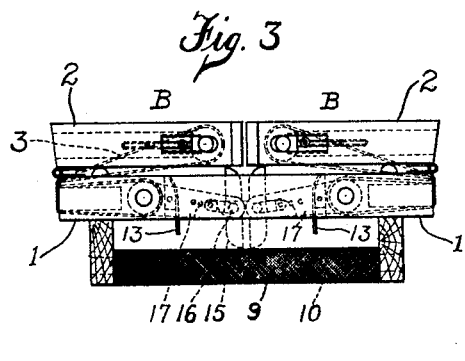
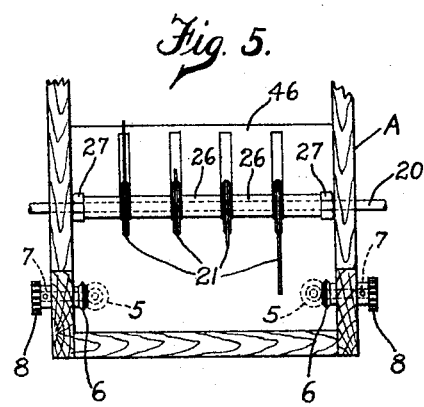
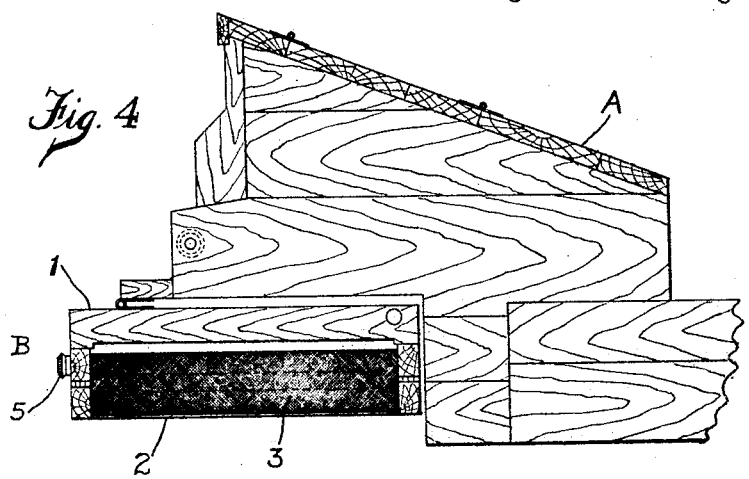
INVENTOR
PETER ODA.
BY
ATTORNEYS

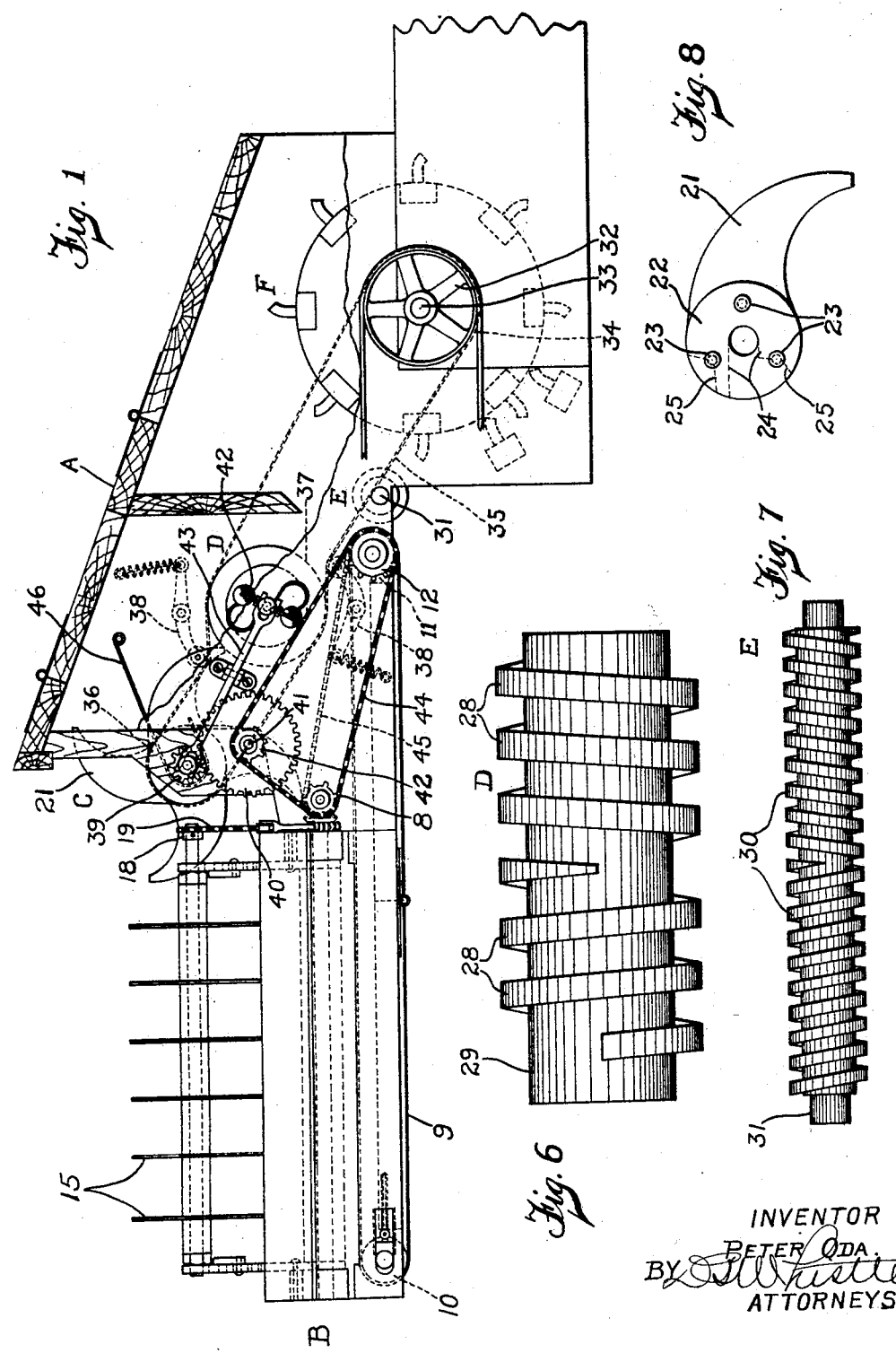

UNITED STATES PATENT OFFICE.

PETER ODA, OF NEAR ARCANUM, OHIO.

BAND-CUTTER AND FEEDER FOR THRESHING-MACHINES.

1,399,271.  Specification of Letters Patent.  Patented Dec. 6, 1921.

Application filed July 10, 1920. Serial No. 395,202.

*To all whom it may concern:*

Be it known that I, PETER ODA, a citizen of the United States, residing near Arcanum, in the county of Preble and State of Ohio, have invented certain new and useful Improvements in Band-Cutters and Feeders for Threshing-Machines or the like, of which the following is a specification, reference being had therein to the accompanying drawings.

This invention relates to threshing machines and more particularly to automatic feeders for threshing machines, having for its particular object to provide a feeder which will be more effective in delivering the grain to the threshing cylinder in even quantities to effect regular feeding of the grain and balanced operation of the machine as a whole.

A common difficulty experienced in the operation of automatic grain feeders consists in that the grain may be delivered to the cylinder unevenly, that is to say, a number of sheaves may be bunched or piled one upon another as the same are delivered to the cylinder, thus acting to choke the mechanism and temporarily to check the speed of the machine, and to prevent more or less effective separation of the grain from the straw.

A further common defect of automatic grain feeders consists in that the straw when released in the sheaf, when the binding twine is cut, is not properly spread or distributed as it passes to the cylinder, thus it will act, more or less, even when a single sheaf is delivered to the cylinder at a time, to choke the cylinder and slow down the machine with the result, as stated, that the grain is not fully threshed from the straw as it passes through the cylinder to the grain separator.

The main object of the present invention, therefore, is to provide an automatic grain feeder which will be effective to prevent delivery of the sheaves of grain in bunches and which will act upon the straw after it has been released in the sheaf to properly spread the same before it passes to the cylinder.

Other important features of the invention consist in improved means for retarding the movement of the straw as it enters the cylinder to further equalize its distribution over the cylinder mechanism and to insure effective breaking up of the grain heads and pods as the same are acted upon by the cylinder mechanism.

The invention as herein shown and described is constructed throughout on the rotary principle, and is designed especially to be used in connection with a grain separator of the type shown in my copending application Ser. No. 379,089, filed May 5, 1920, but the improved automatic grain feeder is not limited to any particular type of grain separator as the same may be used effectually with threshers of any of the usual constructions.

Other objects of the invention realized in the construction herein shown and described will be apparent from the following detailed specification.

In the drawings:

Figure 1 is a side elevation of the feeder with portions of the machine casing broken away to show the arrangement of its mechanism;

Fig. 2 is an end view of the grain feeding tables in open position;

Fig. 3 is an end view of the feeding tables in closed position;

Fig. 4 is a side view of the feeding tables as folded when the machine is to be transported;

Fig. 5 is a detail view of the band cutter;

Figs. 6 and 7 are detail views respectively of the straw spreader and retarder devices;

Fig. 8 is a detail of a band cutter blade.

It will be understood that the construction as shown in the drawings is for the purpose of illustrating the invention in a preferred form, and that various modifications may be made thereof without departing from the principle and spirit of the invention as defined and comprehended in the appended claims.

Grain threshers of this character are usually mounted on suitable trucks whereby the same may be transported, and power for operating the same is usually supplied from a portable source of power, such as a steam or gas engine which may be connected to the thresher in any suitable manner, as by a belt.

As here shown, the construction of the improved feeder consists of a suitable frame and machine casing A which is adapted to support and inclose the feeder mechanism, suitable bearings being provided in the casing for various shafts whereby operating movement is transmitted to different parts of the mechanism.

The feeder mechanism consists as here shown of two oppositely disposed feeder tables B having endless carriers coöperating therewith to receive the grain and deliver it to the threshing cylinder, band cutter C, straw spreader D, and straw retarder E, which are arranged in relation one to another to deliver the grain in the straw to the thresher cylinder F in such regulated quantities whereby effective threshing of the grain from the straw as it passes through the cylinder mechanism will be accomplished.

The feeding tables B, are here shown extending laterally, substantially in a horizontal plane, on opposite sides of the machine, and grain may be delivered to the machine by either table, or by both tables simultaneously. The tables consist of an inner frame support 1 and outer foldable wing frame supports 2 hinged thereto, the table as a whole being adapted to be folded as indicated in Fig. 4 when the machine is to be transported. Each table is provided with an endless carrier 3 operable over rollers 4 mounted adjacent the inner and outer longitudinal ends of the tables. The inner rollers 4 are provided at their inner ends with bevel gears 5 meshing with corresponding gears 6, secured to shafts 7 which are mounted in suitable bearings in the casing A and have secured to their outer ends sprocket gears 8, whereby operating movement is transmitted to the inner rollers 4, the outer rollers 4 being mounted to rotate freely and idly under the weight and tension of the endless carriers 3.

Coöperating with the carriers 3 and running longitudinally of the machine, transversely to the carriers 3 and in a horizontal plane substantially below the plane of the carriers 3, is an endless carrier 9 which traverses an idle roller 10 mounted adjacent the outer end of the frame 1, and a driver roller 11 mounted in suitable bearings in the casing A and having sprocket gears 12 secured to both ends thereof outwardly of the casing. The operating connections of the sprockets will be described in connection with the operation of the machine as a whole.

Secured to the inner longitudinal edges of the frame 1 and extending longitudinally thereof above carrier 9 are oppositely disposed guides 13 which coöperate with the carrier 9 in moving the grain forward to the cylinder F. Rotatable guards 14 consisting of kicker arms 15 mounted on shafts 16 supported in upright frames 17 and connected to inner rollers 4 by chain and sprocket connections 18—19 whereby operating movement is imparted to the arms 15; the frames 17 being hinged to the frame 1 in a manner that permits of folding the frames 17 together with the mechanism supported thereon in the manner shown in Figs. 3 and 4 when the machine is to be transported.

The band cutter C is supported transversely of the machine, in coöperative relation with the endless carrier 9, and consists of a shaft 20 supported in suitable bearings in the casing A, and a plurality of rotatable knives 21 which are arranged in a horizontal plane above carrier 9 and are adapted to penetrate the sheaves of grain as the same are moved thereunder on the carrier and sever the twine, or other means whereby the sheaves are bound, thus to release the straw before it passes to the threshing cylinder.

The knives 21 of the band cutter as shown in Fig. 8, are preferably detachably secured to the shaft 20 by means of mounting plates 22 which are secured together by means of rivets 23 and spaced apart to receive the cutter blades therebeween, the blades having two inwardly projecting fingers 24 spaced apart to clear shaft 20, each finger being notched as at 25 and adapted to engage one of the rivets 23 whereby the blade will be held in operative relation to the shaft. The mounting plates 22 are held in fixed relation to shaft 20 by means of spacing collars 26 which are held in adjusted relation on the shaft by means of lock nuts 27 threaded on the shaft adjacent its opposite ends.

The straw spreader D is mounted transversely in the casing A above carrier 9 and rearwardly of and in a substantially lower plane than the band cutter. This device as here shown consists of oppositely arranged spirals 28 on a rotatable drum 29, the opposite spirals having their inner ends adjacent each other substantially at the center of the drum 29, the spirals being directed outwardly and terminating near the side walls of the machine casing A, thus the action of the spirals on the straw after the same is released in the sheaf will be to spread the straw from the center outwardly toward the sides of the casing to prevent the straw passing in bunches to the cylinder.

The straw retarder E is mounted transversely in the casing A, rearwardly adjacent the inner terminal of carrier 9, between the carrier and the cylinder F and substantially in the horizontal plane of the carrier. This device consists of oppositely disposed, inverse spirals 30 arranged on an idle shaft 31 similar to the arrangement of the spirals 28 of the straw spreader D. The spirals 30 engage the straw as it passes to the cylinder and act to retard and further spread the same, thus serving to prevent or to minimize the tendency of the straw to bunch and thereby to choke the operation of the cylinder.

The cylinder F is here shown in conventional form only to illustrate its coöperative relation with the feeder mechanism, and it will be understood that the cylinder and the grain separator (not shown) may be of any form of the usual construction.

Power is applied to the machine as here shown by means of a belt pulley 32 secured to the cylinder shaft 33. A second belt pulley 34 secured to the cylinder shaft is connected by the means of a belt 35 with pulleys 36 and 37 secured to the supporting shafts respectively of the band cutter C and straw spreader D, the belt being kept taut by means of idler pulleys 38. Thus the band cutter and straw spreader will be operated by direct connection with the cylinder.

A spur gear 39 is also secured to the band cutter shaft, shaft 20, and meshes with an intermediate spur gear 40 mounted on a stud shaft 41 secured in the casing A, a sprocket gear 42 being also mounted on shaft 41. The gear 39 is adapted to be moved automatically into and out of operative relation with gear 40 by means of any suitable clutch control mechanism, here shown more or less conventionally as a governor 52ª mounted on the straw spreader shaft and connected with one of the clutch members by means of a shifter lever 43.

A sprocket chain 44 traverses the sprockets 42, 12, and 8, thus the endless carriers 3 and 9 will be operated through this connection. The sprocket gear 12 is of substantially smaller diameter than the gear 8, thus the carrier 9 will be operated at higher speed than the carriers 3, the ratio between the gears being determined according to the speed of the machine and the capacity of the cylinder.

The connection to one of the gears 8 is made on the opposite side of the machine by means of the sprocket gear 12 secured to the opposite end of the roller 11 and a chain 45, thus both carriers 3 will be driven at substantially equal speed.

The operation of the feeder as a whole stated briefly is substantially as follows:

The grain will be delivered to one or both carriers 3 which will deliver the same to carrier 9, the guards 14 acting to prevent the sheaves, or loose straw if the grain should be unbound, passing to carrier 9 in bunches. Thus when the grain is bound the sheaves will be delivered to carrier 9 separately, and, carrier 9 operating at relatively higher speed than carriers 3, the sheaves will be carried singly under the band cutter and straw spreader to the cylinder.

In event that feeding of the grain will be too fast for the capacity of the cylinder and will act to materially slow down the machine, the governor 42 will act automatically to shift the clutch mechanism which controls the operation of the carriers 3 and 9. Thus the carriers will be temporarily stopped until the machine again attains operating speed when the clutch by the action of the governor will be automatically shifted to render the carriers operative.

While the feeder mechanism is here shown in a preferred complete form, it will be obvious that the invention will be operative and effective without certain detail features, as the rotatable guards 14 and the straw retarder E, these features being provided to accomplish the fullest measure of regular feeding of the grain under all conditions of operation.

To prevent the straw wrapping around the band cutter blades or shaft a slotted guard and stripper plate 46 is mounted relative to the blades, the ends of the plate being secured to the side walls of the casing 1, thus any straw carried upward with the rotation of the cutter will be removed from the blades by the stripper plate.

The feeder mechanism may be supported relative to the grain separator or main machine in any suitable manner, there being no novelty claimed in connection with this feature of construction.

As best shown in Fig. 2, the grain carrier 9, compared with carriers 3, is relatively narrow, the preferred arrangement being to limit the capacity of carrier 9 to a single sheaf, or like amount of loose grain, at a time, thus further to prevent delivery of the grain to the cylinder in bunches. Carrier 9, being operable at higher speed than carriers 3, when both carriers 3 are operating to deliver grain thereto, will carry the grain to the cylinder evenly, it being assumed that delivery of the grain to carriers 3 will also be even and in the required quantity to effect proper feeding thereof to the cylinder.

When but one of the carriers 3 is to be employed for delivering grain to carrier 9, provision is made, by means of change gearing, as indicated by dotted lines in Fig. 1, to equalize the speed of the two carriers,—that is to say, of carriers 3 and 9 so that both will operate at substantially the same speed and the grain will be delivered to the cylinder in the required proportion. The change of gearing is effected merely by exchanging or substituting gears 8 and 12 of different ratios.

Having thus fully described my invention, I claim:

1. In a threshing machine and in combination with the cylinder thereof, a grain feeder comprising a table extending laterally of said machine, an endless carrier operable thereover to receive the grain, an endless carrier operable in a lower plane and substantially at right angles to said table carrier, adapted to receive the grain therefrom and to convey the same to said cylinder, a rotatable guard arranged in proximity to the upper carrier at its discharge end and means for rotating said guard inversely to the direction of movement of said carrier.

2. In a threshing machine and in combination with the cylinder thereof, an endless carrier adapted to convey the grain to the cylinder, a band cutter and straw spreader coöperating with said carrier, and a straw retarder comprising a cylinder operable only by the action of the straw thereon and having a peripheral spiral adapted to engage and retard the straw as it passes from the cutter and spreader to the cylinder.

3. In a threshing machine and in combination with the cylinder thereof, an endless carrier adapted to convey the grain to the cylinder, a band cutter and straw spreader coöperating with said carrier, and a freely supported rotatable straw retarder comprising a peripheral spiral disposed between said carrier and the cylinder and acting to engage the straw and retard the same by frictional contact as it passes to said cylinder.

4. In a threshing machine and in combination with the cylinder thereof, an endless carrier adapted to convey the grain to the cylinder, a band cutter and straw spreader coöperating with said carrier, and a straw retarder interposed between said spreader and the cylinder comprising an idle cylinder adapted to be rotated by friction of the straw as the same passes thereover and acting to retard the straw and further spread the same as it passes to the threshing cylinder.

In testimony whereof I affix my signature.

PETER ODA.